United States Patent Office 3,138,307
Patented June 23, 1964

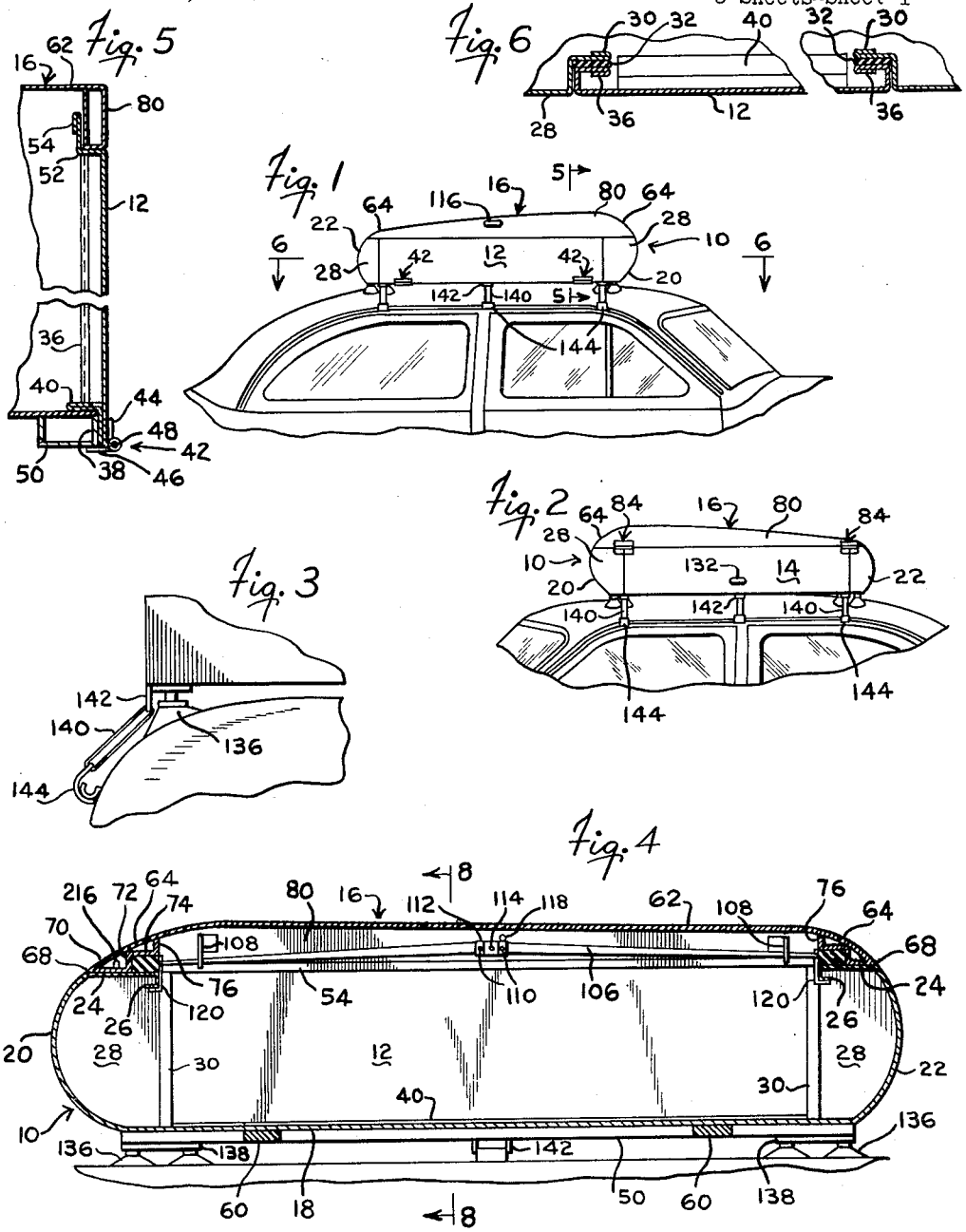

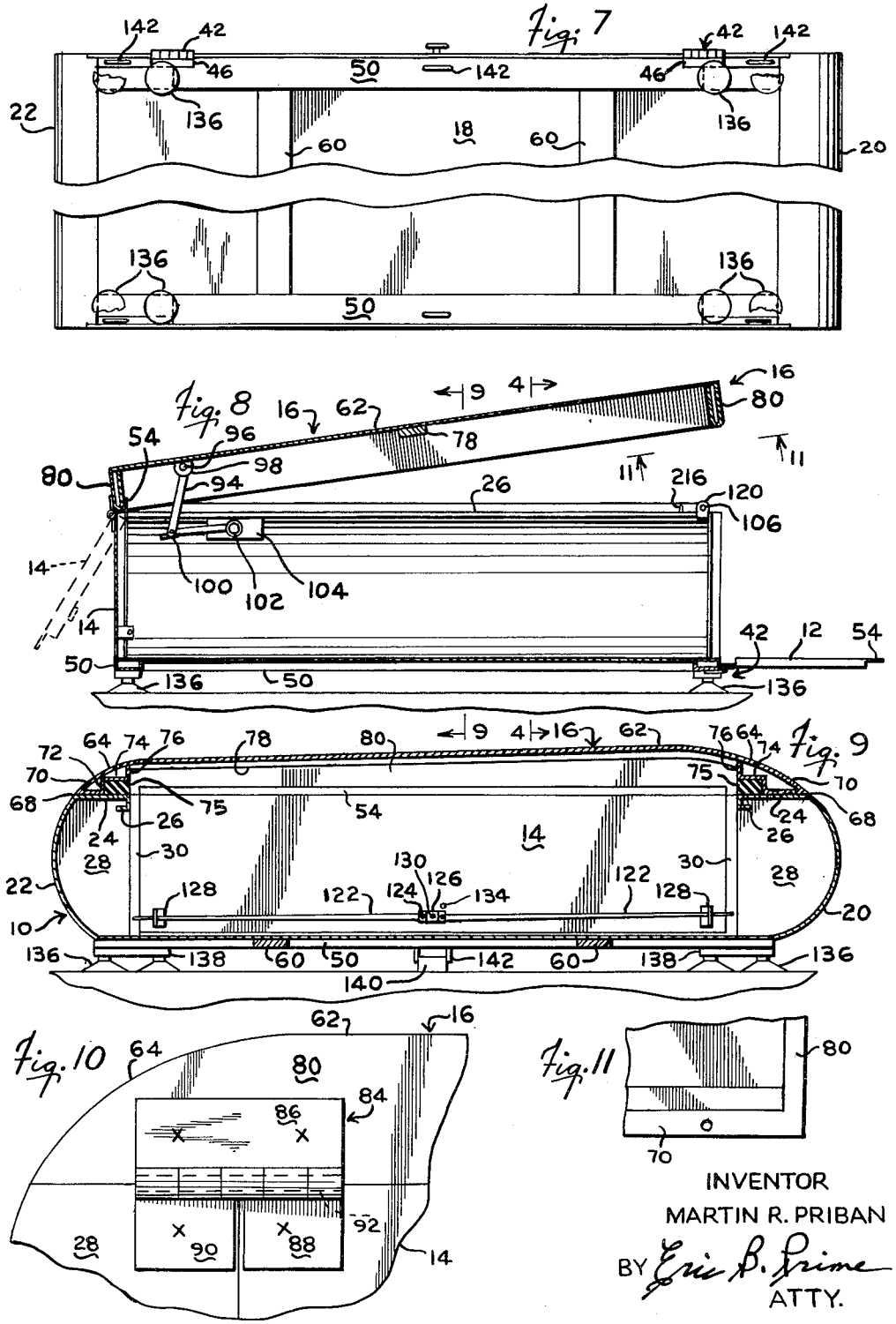

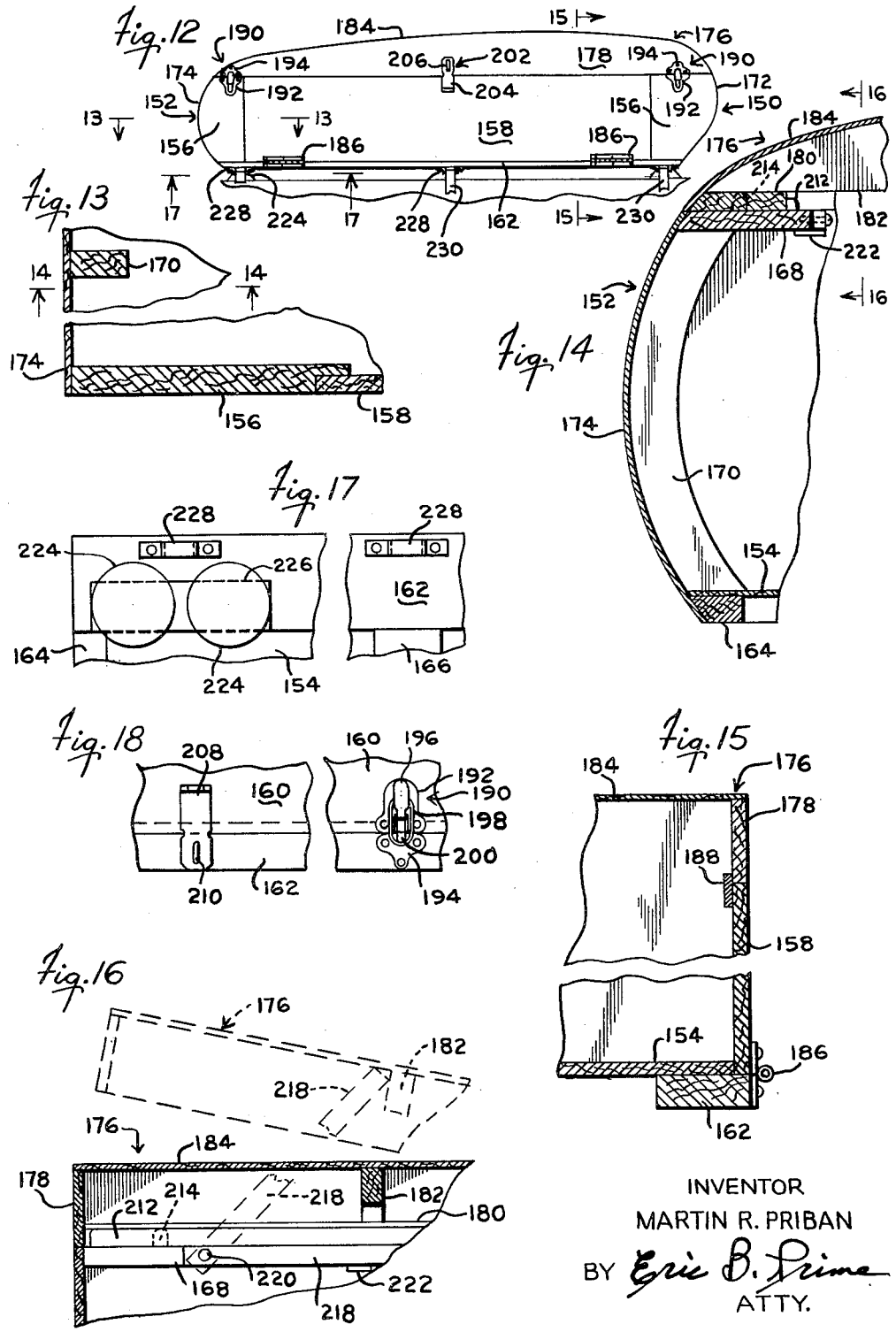

3,138,307
CAR TOP LUGGAGE CARRIER
Martin R. Priban, 228 55th St., Downers Grove, Ill.
Filed Oct. 9, 1962, Ser. No. 229,391
9 Claims. (Cl. 224—42.1)

The present invention relates to luggage carriers for the tops of automobiles and more particularly to a carrier housing for enclosing the contents and adapted for being readily attached to or detached from the top of the automobile body.

An object of the invention is to provide a carrier housing for transporting baggage which may be mounted on the top of an automobile body and which provides easy access to the interior of the housing for loading or unloading the baggage.

Another object of the invention is to provide a novel carrier for housing baggage on the top of an automobile body which provides access to the baggage compartment from each side of the automobile.

A further object is to provide a novel baggage carrier for mounting on the top of an automobile body which provides access to the baggage compartment from the top of the housing and opposite sides thereof.

An additional object is to provide a baggage carrier housing for mounting on the top of an automobile body having a novel arrangement of door panels for providing access to the chamber within the housing.

A further object of the invention is to provide a car top luggage carrier housing having access doors in the top and opposite sides thereof and a novel hinge arrangement for mounting the doors.

Another object of the invention is to provide a car top carrier housing having a plurality of hinged access door panels and a novel latching arrangement for fastening the doors in their closed positions.

Still another object is to provide a car top luggage carrier having a novel housing body structure and novel door panel structures.

An additional object is to provide a weather-proof car top carrier housing which may be fabricated in production quantities from a light weight sheet material such as aluminum, plywood, resin impregnated glass cloth, or other suitable materials for excluding the elements.

Other objects and advantages of the invention will appear from the following detailed description in which reference is made to the accompanying drawings.

In the drawings illustrating the invention:

FIGURE 1 is a side elevation of the carrier shown mounted on the top of an automobile body;

FIGURE 2 is a corresponding side elevation of the carrier viewed from the side opposite to that shown in FIGURE 1;

FIGURE 3 is an enlarged fragmentary end view of the carrier showing fastening elements for attaching it to the car top;

FIGURE 4 is longitudinal vertical section of the carrier viewed in the direction of the side shown in FIGURE 1, and taken along the line 4—4 of FIGURE 8 with the cover and side doors in closed positions;

FIGURE 5 is a fragmentary vertical sectional view taken along the line 5—5 of FIGURE 1;

FIGURE 6 is a fragmentary horizontal sectional view taken along the line 6—6 of FIGURE 1;

FIGURE 7 is a fragmentary bottom plan view of the housing body showing the arrangement of the mounting and fastening elements for securing the carrier to the car top;

FIGURE 8 is a transverse vertical sectional view taken along the line 8—8 of FIGURE 4, but showing the top cover and the side door appearing in FIGURE 1 in open positions, a partially open position of the opposite side door appearing in FIGURE 2 being illustrated by broken lines;

FIGURE 9 is a transverse vertical section taken along the line 9—9 of FIGURE 8 when the top and side doors are in closed positions and in the direction of the side door shown in FIGURE 2;

FIGURE 10 is an enlarged fragmentary detail elevation of one of the hinges shown in FIGURE 2 for mounting the cover and one of the side doors;

FIGURE 11 is a fragmentary bottom plan view of a corner of the cover taken in the direction of the arrows 11—11 in FIGURE 8 when the cover is in an open position showing one of the openings in the cover for receiving one of the guide pins connected to the top of the housing body;

FIGURE 12 is a side elevation of a modified embodiment of the invention corresponding to FIGURE 1 showing alternative fastening means for retaining the cover lid and a side door in their closed positions;

FIGURE 13 is a fragmentary horizontal sectional view taken along the line 13—13 of FIGURE 12;

FIGURE 14 is a fragmentary vertical sectional view taken along the line 14—14 of FIGURE 13;

FIGURE 15 is a fragmentary vertical sectional view taken along the line 15—15 of FIGURE 12;

FIGURE 16 is a fragmentary vertical sectional view taken substantially along the line 16—16 of FIGURE 14, an open position of the cover and prop being indicated in broken lines;

FIGURE 17 is a fragmentary bottom plan view of a corner of the housing body taken along the line 17—17 of FIGURE 12; and FIGURE 18 is a fragmentary elevation of the door on the opposite side of the housing from that shown in FIGURE 12 and corresponding to the door illustrated in FIGURE 2 showing the means for fastening said side door in its closed position.

More specific reference to the figures of the drawings wherein like reference numerals indicate corresponding parts discloses the novel car top carrier embodying the invention as comprising a housing body referred to generally by the reference numeral 10, opposite side door panels 12 and 14, and a cover or lid 16. The housing body has a bottom or floor panel 18 continuous with a front end wall 20 and a rear end wall 22, both of which are arcuate in cross-section to present a streamlined appearance. The end walls 20 and 22 are continuous with flat top inwardly extending flange panels 24 that terminate in turned-under channel formations 26. The channel formations 26 cooperate with the flange panels 24 for structurally stiffening and strengthening the inner edges thereof defining the opening therebetween.

It will be observed that the floor panel 18, end panels 20, 22, flat top panels 24, and channel formations 26 may be shaped from a continuous strip or web of sheet metal and may be cut as a unit from the continuous strip after the bending formations have been completed to provide the major portion of the housing body.

A pair of spaced vertical fixed filler side panels 28 are joined by any suitable means such as welding to the extremities of the floor panel 18, arcuate end panels 20, 22, and flat top panels 24 at each side of the housing to provide access openings for the opposed side door panels 12 and 14.

The floor panel 18, end panels 20, 22, flat top panels 24, and filler panels 28 are thus united into an integral body of the carrier housing.

The filler panels 28 are provided with inwardly offset and projecting vertical flange formations 30 that extend into the openings for the door panels 12 and 14 and function as stops for the side doors 12 and 14 in their closed positions.

The inwardly offset vertical flanges 30 may be provided with resilient weather strips 32, adhesively secured to the outer surfaces thereof for engagement with the door panels 12 and 14, when said door panels are in their closed positions.

The door panels 12 and 14 are preferably formed of sheet metal and have inturned angle shaped end formations 36 for stiffening the ends thereof. The lower edge margin of each door panel 12 and 14 is turned back upon itself to provide a bottom stiffening hem 38 that terminates in an inwardly projecting rib 40. The ribs 40 extend longitudinally of the door panel 12 and 14 between the inturned end formations 36, and are turned back on themselves to provide a hem and thereby avoid the hazard of an exposed prominently projecting cut edge. When the door panels 12 and 14 are in their closed positions the ribs 40 extend over the adjoining parallel marginal areas of the bottom floor panel 18 of the housing body.

The door panel 12 is hingedly mounted at the bottom thereof so that it may be swung vertically in relation to the housing body by a pair of spaced hinges 42. The hinges 42 are of the conventional butt type and comprise two plate portions 44 and 46 movably connected by a hinge pin 48. The hinge plate portions 44 are welded to the bottom hemmed margin 38, and the hinge plate portions 46 are likewise welded to one of a pair of spaced channel shaped reenforcing bars 50 that are welded to the under surface of the floor panel 18 at the side margins thereof. The channels 50 extend the length of the floor panel 18 between the arcuate end walls 20 and 22 of the housing body.

Each of the side door panels 12 and 14 is formed inwardly at 52 and thence upwardly to provide an inwardly offset upstanding flange 54 at the top thereof that extends the length of the door panel. The upstanding flange 54 is reversed on itself to provide a hemmed edge that avoids the disadvantage of a prominent cut edge heretofore referred to.

The upstanding flange 54 of the side door panel 12 cooperates with the top cover door 16 in a manner hereinafter described for retaining the side door panel 12 in its closed position when the cover door 16 is in its closed position.

The bottom floor panel 18 is further strengthened by a pair of spaced stiffening bars 60 welded to the floor panel. The bars 60 are shown in the drawings as being of conventional bar stock, but may, of course, also be channel shaped if so preferred.

The inwardly projecting ribs or flanges 40 extending longitudinally of the doors 12 and 14 at the lower margins thereof and overlying adjacent inside margins of the floor panel 18 when the doors are closed function as splash guards or baffles for the lower joints between the closed doors and the floor panel. Similarly, the inwardly offset upwardly projecting flanges 54 extending longitudinally along the tops of the side doors 12 and 14 for substantially their entire length function as splash guards or baffles for the joints between the cover door 16 and the side doors 12 and 14 when the cover door and side doors are in their closed positions.

The cover or lid 16 comprises a top panel or wall 62 which continues at the opposite ends thereof into downwardly arced end wall or panel formations 64 that are contoured to conform to and meet the arcuate end panels or walls 20 and 22 of the housing body when the cover is in the closed position.

The downwardly arced cover panel formations 64 are turned inwardly along bend lines 68 to provide transversely extending formations 70 that overlie the outer margins of the flat top portions 24 of the housing body when the cover is closed. The transverse formations 70 are thence bent upwardly at 72 and inwardly at 74 to provide angle formations for receiving resilient weather strips 75, preferably of sponge rubber, that are adhesively attached to the flat top panels 24 of the housing body. The inturned formations 70 terminate in upwardly extending flange formations 76 that are bent upwardly from the inwardly extending portions 74 and have the upper ends thereof welded to the inside surfaces of the arcuate cover panel portions 64.

From the foregoing description of the cover or lid 16 up to the present point, it will be observed that the top panel 62, arcuate end portions 64, inturned formations 70 and 74, and upwardly extending formations 72 and 76 may be formed from a continuous sheet of metal, and that the cover may be cut to the proper width from a web of sheet metal continuously formed to provide the formations above described.

The cover is preferably provided with an inside center stiffening bar 78 that extends longitudinally thereof between the upturned flange formations 76. The stiffening bar 78 may be welded to the flange formations 76 and to the interior surface of the cover panel 62 and the adjoining arcuate and continuations 64 thereof.

The cover 16 is further provided with a pair of opposite side wall panels 80 which are welded to the opposed side margin extremities of the panel 62 and the continuous end formations 64, 70, 72, 74 and 76 thereof above described.

The cover side walls 80 are preferably formed of sheet metal channels to provide parallel inside and outside walls disposed in spaced relationship.

When the cover 16 and the side doors 12 and 14 are in their closed positions, the side wall panels 80 of the cover overlies the inwardly offset upstanding flanges 54 of the side doors 12 and 14. The transverse section or thickness of the side wall panels 80 is dimensioned so that the outer surfaces thereof lie in the same plane as the outside surfaces of the side door panels 12 and 14 with which they are associated.

An advantage of the cooperative relationship of the cover 16 and side door 12 in particular, as above described is that the closed cover retains the side door 12 in its closed position, which obviates the necessity for providing a separate fastening means that would otherwise be necessary for holding the side door 12 closed. In order to open the side door 12, the cover 16 is lifted sufficiently to move the side wall panel 80 thereof out of overlapping relationship with the upturned flange 54 of the side door 12 which releases the side door so that it may be opened by being swung downwardly on its hinges 42.

After the side door 12 has been released by the lifted cover 16 and swung open, the cover may be returned to its closed position or fully opened as hereinafter described. In either case the side door 12 may remain in its open position.

From the preceding description it will be observed that the channel formations for providing the side wall panels 80 of the cover 16 may be cut from a length of sheet metal channel formed continuously which facilitates commercial production of the channel units ready for assembly.

In a similar manner the side doors 12 and 14 may be cut from a strip of sheet metal formed continuously to provide the longitudinally extending hemmed flange formations at the top and bottom margins thereof. After the doors have been cut from the strip, the end margins thereof may be bent to form the inturned end flanges of the doors.

The cover 16 and the side door 14 are provided with common hinge means so that they may be swung upwardly to open positions independently of each other.

The hinge means comprises a pair of spaced butt type hinges 84, each of which has an upper plate member 86 welded to one of the side wall panels 82 of the cover 16, and two separate lower plate member 88 and 90 which are respectively welded to the side door 14 and 97 adjacent fixed filler side panel 28 of the housing body. The plate members of each of the respective hinges 84 are connected together by a conventional hinge pin 92.

The positions of the hinges 84 are retained in relation to the housing body by the hinge plates 90 connected to the fixed filler side panels 28 thereof.

The side door 14 being hung by the hinge plates 88 to the hinge pin 92 is thereby swingable upwardly to an open position. When the cover 16 is in its closed position, the side door 14 may be swung upwardly slightly in excess of 180° until the outer surface thereof engages the adjacent top edge of the cover 16 which is sufficient for the door to remain in its full open position. The side door 14 will remain in this full open position until it is purposely swung downwardly for being returned to its closed position.

In a corresponding manner, the hinge plates 86 connecting the cover 16 to the hinge pins 92 provide for the cover being swung upwardly on the hinge pins to provide access to the interior of the housing from the top thereof.

The uppermost open position in which the cover 16 may be disposed and retained is preferably determined by a limit prop 94 as shown in FIG. 8. The prop 94 may have the outer end thereof pivotally connected at 96 to an angle bracket 98 welded to the inside of the cover panel 62 near the hinged side thereof. The limit prop may be jointed at 100 and have the other or inner end thereof pivotally connected at 102 to a depending bracket 104 that is welded to one of the turned-under channel formations 26 of an inwardly extending top flange panel 24 comprising a part of the housing body.

When the cover 16 is disposed in its closed position, the segments of the limit prop 94 are disposed in an angular relationship, as represented in FIGURE 8. As the cover 56 is swung upwardly, the prop segments move into a straight line relationship at the conclusion of which they prevent further upward movement of the cover and retain it in the extreme open position. When the cover 16 is to be closed, the pivotal joint 100 is manually moved out of alignment with the end pivots 96 and 102 so that the arm segments of the prop bar 94 can return to their angular relationship which permits the cover to be closed.

The cover 16 may be fastened in its closed position by a pair of latch rods 106 that are located inside the cover adjacent the channel shaped end panel 80 thereof not connected to the hinges 84. The latch rods 106 extend in opposite directions lengthwise of the cover door or lid 16 and are slidably disposed in mounting brackets 108 welded to the cover side wall panel 80. The latch rods 106 have their adjacent ends pivotally connected at 110 to a link member 112 that is fixed to a rotatable shaft 114 extending through the cover wall panel 80. The shaft 112 is centrally positioned in relation to the cover panel 80 and has the exterior end thereof provided with a manually operable knob 116 that is elongated to indicate the fastened and released positions of the latch rods 106. A fixed stop pin 118 connected to the inside wall of the side cover panel 80 is positioned for engagement by the link member 110 to limit the rotative positions of the link member 110 and knob 116 as well as the withdrawn and extended positions of the latch rods 106.

When the latch rods 106 are extended, the extreme end portions thereof are receivable in a pair of keeper brackets 120 that are welded to the opposed inturned channel formations 26 of the inwardly extending top panels 24 of the housing body. The keeper brackets 120 are also positioned adjacent to the upper ends of the inwardly offset flanges 30 of the housing body side panels 28 and extend upwardly inside of and at the adjacent ends of the weather strips 75 in order not to interfere with the cover being closed.

In order to fasten the cover 16 in its closed position to the housing body, the knob 116 is turned clockwise from a vertical position to a horizontal position which turns the shaft 114 and the link member 110 for projecting the latch rods 106 into the keeper brackets 120.

It will be noted that when the cover 16 is fastened in its closed position the side door 12 may also be secured in its closed position by reason of the channel shaped end wall 80 of the cover extending over the upwardly extending top flange 54 of the side door.

The cover 16 may be unfastened so that it or the side door 12 may be reopened by reversely rotating the knob 116 in a counter-clockwise direction which retracts the latch rods 106 from the keepers 120, thereby releasing the cover.

The side door 14 depending from the hinges 84 is provided with a latching means similar to that above described for retaining the side door 14 in its closed position. This latching means comprises a pair of oppositely extending latch rods 122 having their adjacent ends pivotally connected at 124 to a rotatable link 126 and their remote end portions slidably extending through brackets 128 welded to the inside surface of the panel of the side door 14. The link 126 is fixed to a rotatable shaft 130 that is mounted in and extends through the panel of the side door 14 and which has an elongated actuating knob 132 fixedly connected to the exterior end thereof. A stop pin 134 is welded to the inside surface of the door and positioned for engagement by the link 126 for limiting the retracted and extended positions of the latch rods 122.

When the elongated knob 132 is positioned transversely in relation to the side door 14, the latch rods 122 are disposed in their retracted positions and the side door 14 may be opened or closed.

In order to fasten the side door 14 in its closed position, the elongated knob 132 is turned in a clockwise direction to the horizontal position for rotating the link 126 which projects the latch rods 122 so that the extreme outer end portions thereof extend transversely inside of or behind the inwardly offset vertical flanges 30 of the side panels 28 comprising a part of the housing body for holding the door closed.

Reverse rotation of the knob 132 and the link 126 in a counter-clockwise direction will retract the latch rods 122 from their locking relationship with the flanges 30 and thereby release the side door 14 so that it can be opened.

The luggage carrier may be mounted on the top of an automobile body by a pair of spaced conventional flexible rubber vacuum cups 136 located at each of the four corners of the housing on the under side of the floor panel 18.

The paired vacuum cups 136 are fastened to bars 138 that are preferably connected by welding to the under sides of the floor panel reenforcing bars 50 adjacent the ends thereof.

The luggage carrier is detachably fastened in its mounted position by straps 140 secured to spaced U-shaped loops 142 depending from the reenforcing bars 50 adjacent the side edges thereof. The U-shaped loops are preferably formed of wire rod and have their ends welded to the bars 50. The straps are provided with conventional hook elements 144 thereon for attaching them to the gutter rails on the automobile top, and the straps may be drawn taut for securing the carrier in its mounted position.

A modified form of the invention shown in FIGURES 12 through 18, inclusive, of the drawings illustrates the adaptability of the structure for being fabricated from other materials, such as plywood or resin impregnated fiber glass cloth, that may be available and more suitable to the production methods of certain manufacturers, such as trailer manufacturers or boat builders.

The following description of the modified form will be confined to the salient features and details necessary to provide an accurate understanding of the structure involved, and will attempt to avoid a repetition of details that are already understood from the preceding description of the embodiment illustrated in FIGURES 1 through 11, inclusive.

As shown in FIGURES 12, the modified embodiment of the carrier referred to generally by the reference numeral 150 comprises a housing body 152 having a floor panel 154 and a pair of spaced vertical filler panels 156 disposed at each side thereof for defining an opening for each of the side doors 158 and 160 in the manner hereinbefore described.

The floor panel 154 is mounted on a frame comprising side rails 162, transverse end rails 164, and spaced transverse intermediate rails 166.

Each pair of spaced filler panels 156 at the opposite sides of the housing body have their top ends connected to an inwardly extending top transverse frame member 168 which is reenforced by one or more spaced vertical stiffening ribs 170 spaced intermediate the opposed filler panels 156.

The ribs 170 have their top ends fastened to the transverse frame members 168 and their bottom ends fastened to the floor panel 154. The external arcuate contour of the ribs 170 corresponds to the arcuate contour of the outer edges of the filler panels 156 between which they are disposed.

The arcuate end walls 172, 174 of the housing body are formed of sheets of relatively thin flexible material, such as pressed wood or fiber glass which are shaped to the arcuate contour of the side panels 156 and the intermediate ribs 170 and are secured thereto by any suitable means such as an adhesive or fastening elements.

The cover or lid 176 is fabricated in a similar manner by providing a pair of spaced side panels 178 having their top edges shaped to the contour desired and connected at their ends to transverse frame members 180. One or more longitudinal stiffening ribs 182 having a top contour corresponding to that of the cover side panels 178 may be disposed in spaced parallel relationship between the cover side panels 178 and have their ends connected to the transverse end members 180.

The spaced side panels 178, the transverse members 180 and the longitudinal stiffening ribs 182 provide a frame for the cover to which the top cover panel 184 is secured. The cover panel 184 is likewise preferably formed from a sheet of flexible material that can be readily shaped to the contour of the cover frame elements and side wall panels and secured thereto.

The two side doors 158 and 160 are hingedly mounted on the opposite sides of the housing in the same manner as the respective doors 12 and 14 hereinbefore described and as illustrated in FIGURES 1 and 2. Both side doors 158 and 160 have the same construction, and are preferably formed of plywood panels or other suitable laminates. They may also be fabricated from relatively thin sheet material by providing a rectangular door frame, not shown, on which the thin panel sheet may be mounted.

The side door 160 and the cover or lid 176 are hingedly connected to each other and to the adjacent filler side panels 156 by a common hinge means corresponding to that illustrated in FIGURE 10. The other side door 158 is hingedly mounted at the bottom edge in the manner hereinbefore described for the preceding form of the invention by hinges 186 fastened to a side rail 162 of the floor panel frame, as shown in FIGURE 15.

The side door 158 hinged at the bottom is, of course, positioned at the same side of the housing as the free or swinging end of the cover 176, and is provided with an offset strip 188 secured along the top edge margin thereof.

The strip 188 underlies the adjacent side panel 178 of the cover 176 when the cover is in the closed position for retaining the side door 158 in the closed position, as shown in FIGURE 15.

The cover or lid 176 and the side door 160 may be retained in their closed position shown in FIGURES 12 and 18, by a pair of spaced conventional luggage fasteners 190 instead of the latch rod mechanisms previously described and shown in FIGURES 4 and 9.

Each of the conventional luggage fasteners 190 comprises a latch plate 192 and a keeper plate 194, one of which is attached to the cover 176 or side door 160 and the other being attached to the housing body. Inasmuch as the structural details of all of the fasteners 190 are preferably the same, the following description thereof will be directed to the one best shown in FIGURE 18 for securing the side door 160 in its closed position. As shown in FIGURE 18, each latch plate 192 above referred to has a finger operable spring resisted hinged latch arm 196 to which a wire lock 198 is pivotally connected. When the hinged arm 196 is lifted the wire loop 198 may be positioned on or removed from a projecting boss formation 200 on the keeper plate 194. When the wire loop 198 is placed over the projecting boss 200 on the keeper plate 194 and the hinged arm 196 is swung to its retracted position adjacent its mounting latch plate 192, the wire loop 198 is pulled into engagement with the boss 200 on the keeper plate thereby fastening the closed side door 160. The closed cover is similarly latched or released by its fasteners 190.

The cover lid 176 and side door 158 may be locked in their closed positions by a conventional hasp and keeper combination 202, as is also shown in FIGURE 12. The hasp 204 is shown as being hingedly connected to the side door 158, and is provided with a slot for receiving a projecting U-shaped keeper 206 connected to the cover 176. When the hasp 204 is disposed over the keeper 206 so that the keeper projects through the slot therein, as shown in FIGURE 12, the bar of an open conventional padlock, not shown, may be inserted through the keeper 206 to prevent the hasp 204 from being disconnected from the keeper thereby locking the cover 176 and the side door 158 in their closed positions.

When the cover 176 and the side doors 158 are to be opened, the padlock is removed from the keeper 206 so that the hasp 204 and the keeper 206 may be disconnected.

The side door 160 that is positioned opposite to the side door 158 on the other side of the housing and which is hinged at the top in the manner heretofore described may similarly be provided with a hinged slotted hasp 208 for receiving a keeper 210 connected to the housing element 162 and being locked in its closed position. The fasteners 190 for the door 160 are preferably located near the ends of the door and the hasp 208 about midway therebetween.

As shown in FIGURES 14 and 16, a molding strip 212 may be secured to the top rail 168 of the housing adjacent the inner edge of the overlying cover rail 180 of the cover and substantially coextensive therewith for covering the inner edge of the seam between the rails.

A pair of upwardly extending guide pins 214 connected to the inwardly extending top rails 168 of the housing and receivable in corresponding openings in the overlying transverse rails 180 of the cover 176 adjacent the unhinged side thereof may be provided for guiding the cover 176 into its closed position and preventing lateral or twisting strain on the hinges and latches connecting the cover to the housing body that might otherwise result from the cover shifting its position in relation to the housing when the carrier is in use. Similarly located and attached guide pins 216 may also be provided for the same purpose in the embodiment of the invention first described, as illustrated in FIGURE 4.

The cover 176 may be supported in an open position by a prop bar 218, as shown in FIGURES 14 and 16. The prop bar 218 has one end pivotally connected by a screw or pin 220 to the inner edge of one of the housing transverse frame rails 168 and is normally disposed in a position parallel to the frame rail 168, such as by a stop element 222 attached to the frame rail. When the cover is lifted to a wide open position, the prop bar 218 may be swung to the dotted line position shown in FIGURE 16 so that the free end thereof may be placed in a corner between a stiffening rib 182 and the top panel 184 of the cover which prevents the cover from dropping or closing.

The carrier is supported on the top of a car by a pair of conventional rubber vacuum cups 224 located near each corner of the housing, as heretofore described, and as shown in FIGURE 17. Each pair of the vacuum cups 224 is secured to a block 226 preferably made of wood that is connected to one of the side rails 162 of the floor panel on the lowermost side thereof.

A plurality of spaced U-shaped brackets 228 are also connected to the lowermost side of each of the floor panel side rails 162 for receiving the straps 230 that are customarily employed for securing a carrier in position on the top of a car.

From the foregoing description it will be observed that a car top carrier has been developed that may be readily fabricated from a range of commercially workable sheet materials such as aluminum, steel, fiber glass cloth impregnated with a resin, or plywood or a combination of them. It is also conceivable that the housing body and hinged panels may be molded of plastic. Thus, it will be seen that the structure of the carrier makes it adaptable for commercial production by modern manufacturing methods.

It will also be readily recognized from the preceding description that modifications and changes may be made in the embodiments disclosed herein without departing from the spirit of the invention, particularly in adapting them to varying production methods, consequently it is intended that the invention shall be limited only by the scope of the appended claims.

I claim:

1. A baggage carrier housing for attachment to the top of an automobile body comprising a floor panel, side panels, end panels and a cover, means for detachably connecting the floor panel to the automobile body, one of said side panels including a door, and a common hinge means mounted on said one side panel connecting the cover and the door, said cover being swingable vertically on the hinge means for providing access to the interior of the housing from the top thereof, and said door being swingable on the hinge means for providing access to the interior of the housing from a side thereof.

2. An article as defined in claim 1 wherein the cover is provided with a latch means for retaining the cover in closed position.

3. An article as defined in claim 1 wherein the door is provided with a latch means for retaining the door in closed position.

4. A car top luggage carrier comprising a housing having a floor panel, a front end wall and a rear end wall connected to opposite ends of the floor panel, inwardly extending members connected to the top ends of the end walls, a pair of spaced side panels connected to opposite sides of the floor panel and the corresponding ends of the end walls for defining door openings therebetween at opposite sides of the housing, side doors disposed in said door openings, hinge means connecting one of said doors to the floor panel, hinge means connecting the other of said doors to the adjacent side panels for rotation about an axis extending between said side panels remote from the floor panel, a cover disposed on said housing and connected to said last-named hinge means for being swingable to open and closed positions in relation to the housing, inwardly extending members connected to the ends of the cover and overlying the inwardly extending members connected to the end walls of the housing when the cover is in the closed position, and latch means for retaining the cover and the side doors in closed positions.

5. A car top luggage carrier as defined in claim 4 wherein the inwardly extending members connected to the cover are provided with stepped formations for receiving weather strips on the inwardly extending members connected to the end walls of the housing.

6. A car top luggage carrier as defined in claim 4 wherein the spaced side panels of the housing are provided with inwardly offset door stops at the sides of the door openings for locating the side doors in their closed positions.

7. A car top luggage carrier as defined in claim 4 wherein the spaced side panels of the housing are provided with inwardly offset door stops at the sides of the door openings for locating the side doors in their closed positions, and an inwardly offset member connected to the top of the side door hinged to the floor panel for underlying the closed cover and thereby retaining said side door in its closed position.

8. A car top luggage carrier of the character defined in claim 4 wherein the inwardly extending members of the housing end walls and the cover are respectively provided with cooperating pins and holes for locating and retaining the cover in a fixed position in relation to the housing when the cover is closed.

9. A baggage carrier housing comprising a flat rectangular floor panel adapted to be mounted on an automobile roof with the longiutdinal axis thereof parallel to the longitudinal axis of the automobile and having one surface thereof remote from the roof of the vehicle, two side panels affixed to the floor panel and extending normally therefrom at opposite ends of each of the edges of the floor panel parallel to the longitudinal axis thereof, the side panels terminating in edges remote from the floor panel disposed on a common plane, a first door generally conforming to the area between the side panels of one edge and between the floor panel and the common plane, a first hinge mounting means secured to one edge of the first door and the edge of the floor panel between said side panels, latch means mounted on the first door for securing the first door in alignment with said side panels, a second door generally conforming to the area between the side panels of the other longitudinal edge and between the floor panel and the common plane, a second hinge means mounted on said side panels for mounting the second door for rotation about an axis extending between said side panels in the common plane, a second latch means mounted on the second door for securing the second door in the plane of the side panels adjacent thereto, a front panel mounted on one edge of the floor panel normal to the longitudinal axis thereof and extending between and being sealed to the side panels adjacent to said edge, a rear panel mounted on the other edge of the floor panel normal to the longitudinal axis thereof and extending between and being sealed to the side panels adjacent to said edge, a cover having a lip terminating on a flat plane and dimensions to cover the area between the front panel and back panel and between the longitudinal edges of the floor panel, hinge means mounted on the side panels adjacent to the second door and on the cover for mounting the cover for rotation about the same axis as the second door, said rotational axis being in the plane of the lip and extending along a portion of the lip thereof, and latch means mounted on the side of the cover remote from the axis of rotation for securing the cover to the side walls, said cover fitting snugly between the side panels, front panel, back panel, first door and second door.

References Cited in the file of this patent

UNITED STATES PATENTS

| | | |
|---|---|---|
| D. 185,846 | Baxter | Aug. 11, 1959 |
| 1,508,886 | Dautrick et al. | Sept. 16, 1924 |
| 1,804,868 | Gage | May 12, 1931 |
| 2,057,555 | Clark et al. | Oct. 13, 1936 |
| 2,584,048 | Ramsey | Jan. 29, 1952 |
| 2,597,656 | Martin | May 20, 1952 |